US 8,495,376 B2

(12) United States Patent
Choo et al.

(10) Patent No.: US 8,495,376 B2
(45) Date of Patent: Jul. 23, 2013

(54) APPARATUS AND METHOD FOR CONTROLLING USE OF BROADCASTING PROGRAM USING SIGNATURE IN PROGRAM INFORMATION

(75) Inventors: Hyon-Gon Choo, Daejon (KR); Jeho Nam, Seoul (KR); Moon-Kyun Oh, Daejon (KR); Sangwoo Ahn, Daejon (KR); Sang-Kwon Shin, Daejon (KR); Jooyoung Lee, Seoul (KR); Won-Sik Cheong, Daejon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 289 days.

(21) Appl. No.: 12/608,172

(22) Filed: Oct. 29, 2009

(65) Prior Publication Data

US 2010/0161991 A1   Jun. 24, 2010

(30) Foreign Application Priority Data

Dec. 19, 2008 (KR) .................. 10-2008-0130530

(51) Int. Cl.
*H04L 9/32* (2006.01)
(52) U.S. Cl.
USPC .............. 713/176; 713/168; 726/26; 726/32
(58) Field of Classification Search
USPC ................................. 713/176; 705/51; 726/26
See application file for complete search history.

(56) References Cited

U.S. PATENT DOCUMENTS

| | | | | |
|---|---|---|---|---|
| 6,105,134 A * | 8/2000 | Pinder et al. | ................. | 713/170 |
| 6,182,218 B1 * | 1/2001 | Saito | ............................. | 713/176 |
| 6,396,937 B2 * | 5/2002 | Chen et al. | .................... | 382/100 |
| 6,530,021 B1 * | 3/2003 | Epstein et al. | ................. | 713/176 |
| 6,880,082 B2 * | 4/2005 | Ohta | ............................. | 713/168 |
| 7,467,300 B2 * | 12/2008 | Lapstun et al. | ................ | 713/176 |
| 7,570,762 B2 * | 8/2009 | Kurihara et al. | .............. | 380/201 |
| 7,895,441 B2 * | 2/2011 | Parkinson | ...................... | 713/176 |
| 7,949,604 B2 * | 5/2011 | Asazu et al. | ..................... | 705/51 |
| 8,000,474 B1 * | 8/2011 | Evans et al. | .................... | 380/205 |
| 8,086,862 B2 * | 12/2011 | Terao et al. | ................... | 713/181 |
| 2007/0136416 A1 * | 6/2007 | Taylor | ........................... | 709/203 |
| 2007/0220261 A1 * | 9/2007 | Farrugia et al. | ............... | 713/176 |
| 2008/0072054 A1 | 3/2008 | Choi | | |
| 2012/0189279 A1 | 7/2012 | Kiyama et al. | | |

FOREIGN PATENT DOCUMENTS

| | | |
|---|---|---|
| KR | 10-0722650 B1 | 5/2007 |
| KR | 10-0723311 B1 | 5/2007 |
| KR | 1020070112091 A | 11/2007 |
| KR | 10-0844705 B1 | 7/2008 |
| KR | 10-0965886 B1 | 6/2010 |

OTHER PUBLICATIONS

Guide to Elliptic Curve Cryptography by Darrel R. Hankerson, Scott A. Vanstone, Alfred J. Menezes, Springer-Verlag New York, Inc., 2004, pp. 184-188.*

* cited by examiner

*Primary Examiner* — Linglan Edwards
(74) *Attorney, Agent, or Firm* — Ladas & Parry LLP

(57) ABSTRACT

Disclosed is a broadcasting signal receiving apparatus for controlling use of a broadcasting program using a signature in program information and a method thereof. The broadcasting signal receiving apparatus includes a communicating unit for receiving a broadcasting signal, an extracting unit for extracting a broadcasting program and program information from the received broadcasting signal, and a determining unit configured to generate a temporal signature for confirmation (confirmation signature) which determines whether the program information is changed or not from the original program information and determine validity of the program information by comparing a signature included in the extracted program information with the confirmation signature.

12 Claims, 4 Drawing Sheets

APPARATUS AND METHOD FOR CONTROLLING USE OF BROADCASTING PROGRAM USING SIGNATURE IN PROGRAM INFORMATION

CROSS-REFERENCE TO RELATED APPLICATIONS

The present invention claims priority of Korean Patent Application No. 10-2008-0130530, filed on Dec. 19, 2008, which is incorporated herein by reference.

BACKGROUND OF THE INVENTION

1. Field of the Invention

The present invention relates to a broadcasting signal receiving apparatus for controlling use of a broadcasting program and a method thereof; and, more particularly, to a broadcasting signal receiving apparatus for controlling use of a broadcasting program using a signature in program information and a method thereof.

2. Description of Related Art

Copyright protection of a digital broadcasting program has been receiving attention as digital broadcasting networks such as a terrestrial network and a cable network becomes available.

The digital broadcasting program denotes a broadcasting program produced with digital contents. It is relatively easy and fast to duplicate the digital broadcasting program. The duplication of the digital broadcasting program has the same quality of the original digital broadcasting program. Therefore, digital broadcasting programs are often duplicated and distributed illegally through a P2P site of the Internet. Some digital broadcasting programs are also produced in DVDs and distributed illegally.

In order to prevent the illegal duplication and distribution of the digital contents, program protection information and a program identifier are transmitted with a broadcasting signal as a protection method according to the related art. A receiving apparatus manages program protection information and the program identifier.

Hereinafter, a method of transmitting program protection information and program identifier information using a redistribution control (RC) descriptor and a contents labeling descriptor according to the related art will be described.

Table 1 illustrates a structure of a RC descriptor according to advanced television systems committee (ATSC), and Table 2 shows program protection information (PPI). In addition, the program protection information may be generated according to a program protection information protocol of a terrestrial broadcasting program protection information transmitting and receiving protocol of telecommunications technology association (TTA).

TABLE 1

| Syntax | No. of Bits | Format |
|---|---|---|
| rc_descriptor( ){ | | |
|    descriptor_tag | 8 | 0xAA |
|    descriptor_length | 8 | uimsbf |
|    for(i=0;i<descriptor_length;i++){ | | |
|       rc_information( ) | 8 | uimsbf |
|    } | | |
| } | | |

TABLE 2

| Syntax | No. of Bits | Format |
|---|---|---|
| program_protection_information( ){ | | |
|    version | 8 | 0xAA |
|    redistribution_control_code | 2 | uimsbf |
|    if(redistribution_control_code == '01'){ | | |
|       allowed_max_resolution | 2 | uimsbf |
|       holdback_time | 3 | uimsbf |
|       allowed_max_length | 3 | uimsbf |
|    } | | |
|    redistribution_area | 1 | bslbf |
|    reserved | 5 | uimsbf |
|    ppi_signature | 320 | uimsbf |
| } | | |

As described above, the program protection information is included in rc_information of a RC descriptor and transmitted with a broadcasting program. Here, the program protection information includes copyright information and redistribution information whether a corresponding broadcasting program is allowed or not for redistribution.

Table 3 illustrates a structure of a contents labeling descriptor.

TABLE 3

| Syntax | No. of Bits | Format |
|---|---|---|
| content_labeling_descriptor( ) { | | |
|    descriptor_tag | 8 | 0x36 |
|    descriptor_length | 8 | uimsbf |
|    metadata_application_format | 16 | uimsbf |
|    if      (metadata_application_format== 0xFFFF) { | | |
|       metadata_application_format_identifier | 32 | uimsbf |
|    } | | |
|    content_reference_id_record_flag | 1 | bslbf |
|    content_time_base_indicator | 4 | uimsbf |
|    reserved | 3 | bslbf |
|    if      (content_reference_id_record_flag == '1') { | | |
|       content_reference_id_record_length | 8 | uimsbf |
|       for(i=0;i<content_reference_id_record_length;i++){ | | |
|          content_reference_id_byte | 8 | bslbf |
|       } | | |
|    } | | |
|    if      (content_time_base_indicator== 1|2){ | | |
|       reserved | 7 | bslbf |
|       content_time_base_value | 33 | uimsbf |

TABLE 3-continued

| Syntax | | No. of Bits | Format |
|---|---|---|---|
| | reserved | 7 | bslbf |
| | metadata_time_base_value | 33 | uimsbf |
| } | | | |
| if | (content_time_base_indicator== 2){ | | |
| | reserved | 1 | bslbf |
| | content_id | 7 | uimsbf |
| } | | | |
| if | (content_time_base_indicator==3\|4\|5\|6\|7){ | | |
| | time_base_association_data_length | 8 | uimsbf |
| | for(i=0;i<time_base_association_data_length;i++){ | | |
| | reserved | 8 | bslbf |
| | } | | |
| } | | | |
| for | (i=0; i<N;i++){ | | |
| | private_data_byte | 8 | bslbf |
| } | | | |
| } | | | |

As described above, the program identifier information is included in content_reference_id_byte of a contents labeling descriptor and transmitted with a broadcasting program according to ATSC A/57B.

However, the protection method according to the related art does not disclose a technology of preventing illegal duplication and distribution of a broadcasting program although it teaches a method for transmitting the program protection information and the program identifier with the broadcasting signal and enabling a receiver to manage them.

Therefore, there is a demand for developing a method for controlling use of a broadcasting program in order to exterminate copyright infringement through illegal duplication and distribution of a broadcasting program.

SUMMARY OF THE INVENTION

An embodiment of the present invention is directed to providing a broadcasting program receiving apparatus for controlling use of a broadcasting program using a signature in program information and a method thereof.

In accordance with an aspect of the present invention, there is provided a broadcasting signal receiving apparatus for controlling use of a broadcasting program using a signature included in program information, including a communicating unit configured to receive a broadcasting signal, an extracting unit configured to extract a broadcasting program and program information from the received broadcasting signal, and a determining unit configured to generate a temporal signature for confirmation (confirmation signature) which determines whether the program information is changed or not from the original program information and determine validity of the program information by comparing a signature included in the extracted program information with the confirmation signature.

In accordance with another aspect of the present invention, there is provided a broadcasting signal receiving method for controlling use of a broadcasting program using a signature included in program information, including receiving a broadcasting signal, extracting a broadcasting program and program information from the received broadcasting signal, generating a temporal signature for confirmation (confirmation signature) which determines whether the program information is changed or not from the original program information, and determining validity of the program information by comparing a signature included in the extracted program information with the confirmation signature.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

DESCRIPTION OF SPECIFIC EMBODIMENTS

The advantages, features and aspects of the invention will become apparent from the following description of the embodiments with reference to the accompanying drawings, which is set forth hereinafter.

Figure 1:
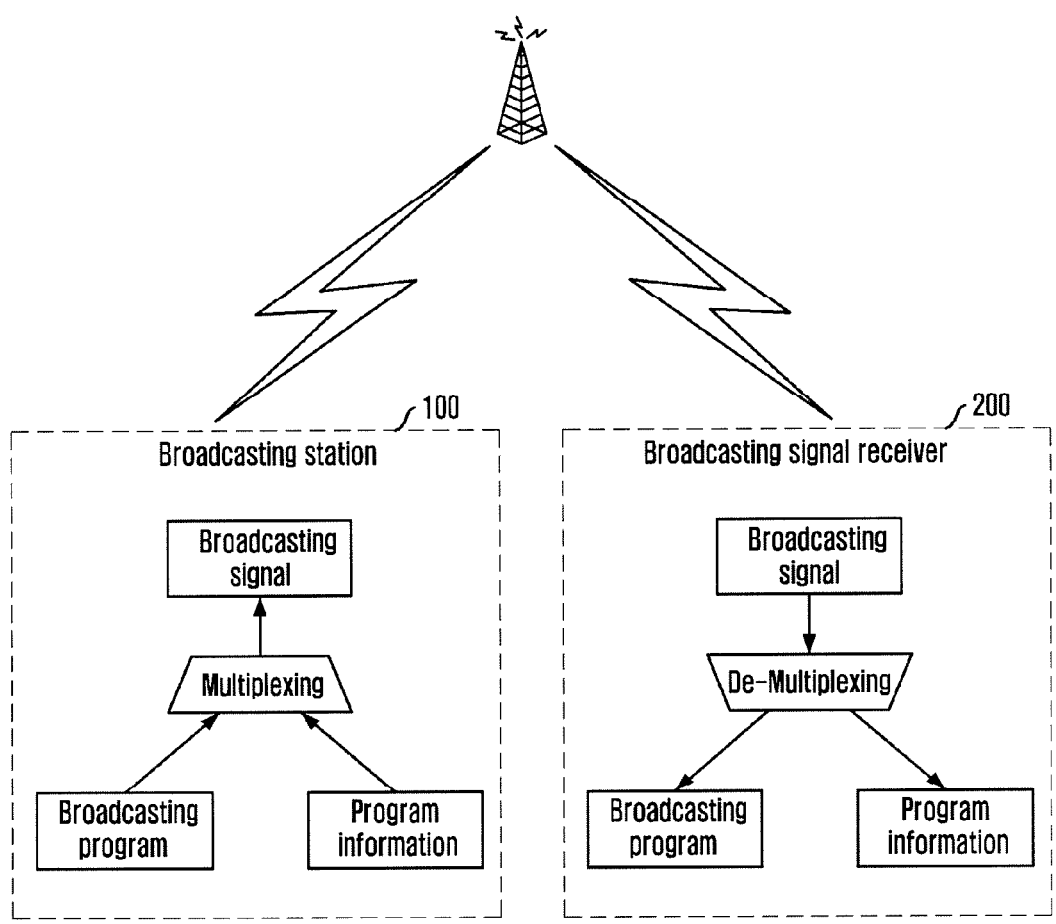
FIG. 1 is a diagram illustrating a network of a system for controlling use of a broadcasting program in accordance with an embodiment of the present invention.

FIG. 1 is a diagram illustrating a network of a system for controlling use of a broadcasting program in accordance with an embodiment of the present invention.

As shown in FIG. 1, a system for controlling use of a broadcasting program includes a broadcasting station 100 for transmitting a broadcasting signal and a broadcasting signal receiver 200.

The broadcasting station 100 generates a broadcasting signal by multiplexing a broadcasting program and program information and transmits the generated broadcasting signal to the broadcasting signal receiver 200.

Here, the broadcasting program may be visual contents such as dramas and movies. The broadcasting program may be formed of digital contents which are produced by processing characters, texts, voice, sound, image, and video in digital.

The program information may include program protection information or a program identifier. Preferably, the program protection information may include permission information for duplication and distribution of a corresponding broadcasting, copyright information, and authentication information. Particularly, the program protection information includes a signature X. The signature X is inserted to determine whether each field value includes error or not when the broadcasting program and the program information are generated.

The program protection information is included into, for example, a RC descriptor and transmitted to the broadcasting signal receiver 200 through PSIP or PSI. Also, the program identifier information is included in, for example, a contents labeling descriptor and transmitted to the broadcasting signal receiver 200 through PSIP or PSI.

The broadcasting signal receiver 200 receives a broadcasting signal, demultiplexes the received broadcasting signal, and extracts the broadcasting program and the program information from the received broadcasting signal.

Although the broadcasting signal was described to be transmitted and received between the broadcasting station and the broadcasting signal receiver in the present embodiment, the present invention is not limited thereto. The system for controlling use of a broadcasting program according to the present invention may include a plurality of broadcasting signal receivers. The plurality of broadcasting signal receivers may exchange the broadcasting signals with each others. Therefore, the broadcasting signal may denote not only a signal transmitted from the broadcasting station but also a signal including a broadcasting program and program information transmitted and received between the broadcasting signal receivers.

Figure 2:
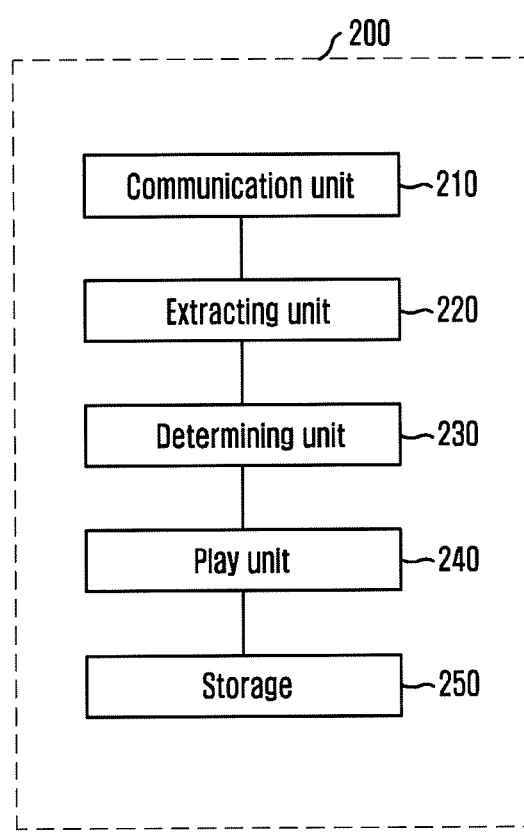
FIG. 2 is a diagram illustrating configuration of a broadcasting signal receiving apparatus in accordance with an embodiment of the present invention.

FIG. 2 is a diagram illustrating configuration of a broadcasting signal receiving apparatus in accordance with an embodiment of the present invention.

As shown in FIG. 2, the broadcasting signal receiver 200 includes a communication unit 210 for receiving a broadcasting signal, an extracting unit 220 for extracting a broadcasting program and program information from the received broadcasting signal, and a determining unit 230 for generating a temporal signature X' for confirmation (confirmation signature) which determines whether the program information is changed or not from the original program information and determining validity of the program information by comparing a signature X included in the extracted program information with the confirmation signature X'. The broadcasting signal receiver 200 may further include a play unit 240 for playing the extracted broadcasting program only if the determining unit 230 determines that the program information is valid and the storage 250 for storing the extracted broadcasting program and program information.

The communication unit 210 communicates with a predetermined server or another broadcasting signal receiver 200 in order to transmit and receive a broadcasting signal. For example, the communication unit 210 may receive a broadcasting signal through communicating with a broadcasting station or a digital content distribution server. The communication unit 210 may also transmit and receive a broadcasting signal by communicating with another broadcasting signal receiver 200.

The extracting unit 220 extracts a broadcasting program and program information from the received broadcasting signal. Here, the extracted program information is transferred to the determining unit 230, and the broadcasting program is transferred to the play unit 240. Also, the extracted broadcasting program and program information may be stored in the storage 250.

The determining unit 230 determines whether a corresponding broadcasting program is legally distributed or not. The determining unit 230 generates a confirmation signature X' (temporal signature for confirmation) from the program information and determines the validity of the corresponding program.

The broadcasting signal is initially generated by the broadcasting station 100 as described above. The broadcasting signal includes program information formed according to a broadcasting protocol. Particularly, the broadcasting signal includes a signature X for confirming whether field values in the program information have error or not. The signature X is generated by reflecting the program information when the broadcasting signal is initially generated. Meanwhile, it may be necessary to change program information included in the broadcasting signal in order to duplicate a broadcasting program restricted for distribution in the broadcasting signal receiver 200. That is, authentication information, distribution information, or copyright information is modified, or program identifier information is changed. However, the signature X, which is generated when the broadcasting signal is initially generated and included in the program information, sustains as an initial value although the broadcasting program is illegally duplicated.

Therefore, the determining unit 230 generates a confirmation signature X' that reflects current program information in order to confirm whether the program information is changed or not. For example, if program information includes program protection information or program identifier information, the determining unit 230 generates a confirmation signature X' for confirming whether the program protection information or the program identifier information is changed or not.

That is, the determining unit 230 generates the confirmation signature X' based on current program information and compares the confirmation signature X' with the signature X that is generated based on program information of an initial broadcasting signal.

If the signature X is identical to the confirmation signature X', it means that the program information is not changed. Therefore, the determining unit determines that the program information is valid. That is, it is determined that the corresponding broadcasting program is usable. On the contrary, if the signature X is different from the confirmation signature X', it means that a corresponding broadcasting program is illegally duplicated so the program information is changed. Therefore, the determining unit determines that the program information is invalid. That is, it is determined that the corresponding broadcasting program is unusable.

Here, the determining unit 230 generates the confirmation signature X' from the program information extracted by the extracting unit 220. For example, the confirmation signature X' can be generated as follows. An input stream is generated using program information except the signature X, a hash value of the input stream is calculated. The confirmation signature X' is generated from the hash value, a public key parameter, and the signature X. The detail method of generating the confirmation signature X' will be described with reference to FIG. 4 in later.

The play unit 240 receives the broadcasting program extracted by the extracting unit 220 and plays the received broadcasting program. If the determining unit 230 determines that the program information is invalid, the play unit 240 does not play the corresponding broadcasting program. Here, the play unit 240 may output a warning sound or sign that informs a user that the corresponding program is unusable.

The storage 250 stores the broadcasting program and the program information extracted by the extracting unit 220.

Here, it is preferable to store the broadcasting program and the program information with encoding.

Figure 3:
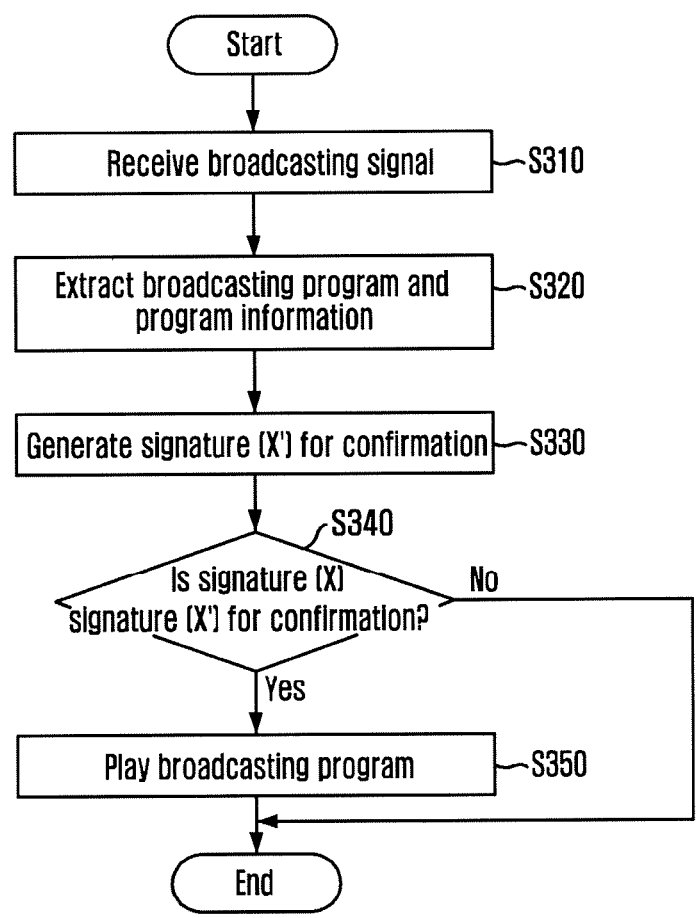
FIG. 3 is a flowchart illustrating a method for controlling use of a broadcasting program in accordance with an embodiment of the present invention.

FIG. 3 is a flowchart illustrating a method for controlling use of a broadcasting program in accordance with an embodiment of the present invention.

Since the method for controlling use of a broadcasting program is substantially identical to the apparatus for controlling use of a broadcasting program according to the present embodiment described with reference to FIGS. 1 and 2, detail description thereof is omitted.

At step S310, the communicating unit 210 receives a broadcasting signal. Then, the extracting unit 220 extracts a broadcasting program and program information from the received broadcasting signal at step S320. The determining unit 230 generates a confirmation signature X' from the extracted program information in order to determine whether the program information is changed or not at step S330.

At step S340, the validity of the program information is determined by comparing the signature X included in the extracted program information with the confirmation signature X'.

If the signature X and the confirmation signature X' are identical, the program information is determined as valid and the play unit 240 plays the broadcasting program at step S350. On the contrary, if the signature X is different from the confirmation signature X', the program information is determined as invalid. Therefore, the corresponding broadcasting program is restricted from being played. Here, a user may be informed by providing warning information on the invalidity of the broadcasting program.

Figure 4:
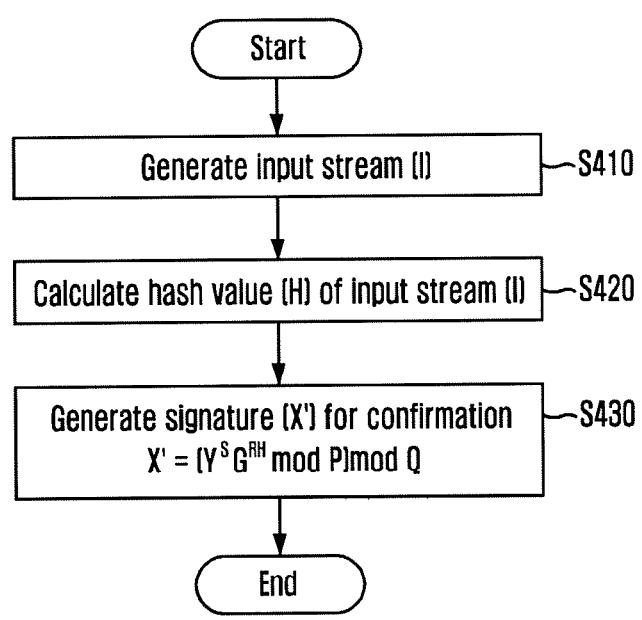
FIG. 4 is a flowchart illustrating a method for generating a confirmation signature in accordance with an embodiment of the present invention.

FIG. 4 is a flowchart illustrating a method for generating a confirmation signature in accordance with an embodiment of the present invention. That is, FIG. 4 shows generating a confirmation signature X' at step S330 of FIG. 3 in detail.

Hereinafter, it is assumed that program information includes program protection information and program identifier information and the program protection information includes a signature X. Also, the signature X is formed of {R, S}, the program protection information is formed of {A, X}, and the program identifier information is formed of {B}.

At first, an input stream {I={A,B}} is generated from the program information except the signature X at step S410. That is, the input stream {I={A,B}} by combining the program protection information {A} and the program identifier information {B} except the signature.

Then, a hash value (H) of the input stream (I) is calculated at step S420. Here, the hash value H may be calculated using, for example, a hash function (H=h(I)) such as HAS-160 or SHA-1. Since such a method of calculating a hash value is well known to those skilled in the art, the detail description thereof is omitted.

Then, a confirmation signature X' is generated using a hash value (H), public key parameters P, Q, G, and Y, and the signature X at step S430. The public key is a public encryption key that is used for coding the broadcasting program and the program information. The parameters P, Q, G, and Y of the public key are used for generating the confirmation signature X'. The configuration and the length of the public parameter may differ according to a public key algorithm. Since the use of the public key is widely known to those skilled in the art, the detail description thereof is omitted.

Here, the confirmation signature X' may be generated using Eq. 1.

$$X'=(Y^S G^{RH} \bmod P) \bmod Q \qquad \text{Eq. 1}$$

Here, the public key parameters P, Q, G, and Y have the identical value irrespective of whether the broadcasting program is illegally duplicated or not. However, since the hash value H is generated based on the program signal and the program identifier except the signature X, the hash value H is changed according to whether the broadcasting program is illegally duplicated or not.

Therefore, if a corresponding broadcasting program is legally distributed, the signature X and the confirmation signature X' have the same value. However, if a corresponding broadcasting program is illegally duplicated, the signature X and the confirmation signature X' have the different values.

The method of generating the confirmation signature X' using Eq. 1 is only an exemplary embodiment. The confirmation signature X' can be generated through various methods using the program information. For example, the confirmation signature X' can be generated using a KCDSA algorithm or a DSA algorithm. The method of generating confirmation X' is decided according to a signature generation algorithm used in an initial broadcasting station.

As described above, the broadcasting signal receiving apparatus and method for controlling use of a broadcasting program according to the present invention can determine validity of program information by comparing the signature included in program information with the confirmation signature for determining whether the program information is changed or not. That is, the broadcasting signal receiving apparatus and method according to the present invention determine the validity of the program information before using the program information and restricts the use of the corresponding broadcasting program if it is determined that the corresponding program is illegally duplicated or forged.

The above described method according to the present invention can be embodied as a program and stored on a computer readable recording medium. The computer readable recording medium is any data storage device that can store data which can be thereafter read by the computer system. The computer-readable recording medium includes a read-only memory (ROM), a random-access memory (RAM), a CD-ROM, a floppy disk, a hard disk and an optical magnetic disk.

While the present invention has been described with respect to the specific embodiments, it will be apparent to those skilled in the art that various changes and modifications may be made without departing from the spirit and scope of the invention as defined in the following claims.

What is claimed is:

1. A broadcasting signal receiving apparatus capable of controlling use of a broadcasting program by using a signature included in program information in a system for controlling use of a broadcasting program, comprising:
    a communicating unit configured to receive a broadcasting signal;
    an extracting unit configured to extract a broadcasting program and program information from the received broadcasting signal; and
    a determining unit configured to generate a confirmation signature and determine whether the program information is changed or not from the program information, and determine whether the program information is valid by comparing a signature included in the program information with the confirmation signature;
    wherein the program information includes program protection information and a program identifier;
    wherein the program protection information includes permission information for duplication and distribution of a corresponding broadcasting, copyright information, and authentication information;

wherein the signature included in the program protection information of the program information is generated by reflecting the program information when the broadcasting signal is initially generated, said signature is used to determine whether each field value includes error or not in the program information;

wherein the determining unit is configured to generate an input stream using the program information except the signature, calculate a hash value of the input stream, and generate the confirmation signature from the hash value, public key parameters, and the signature.

2. The broadcasting signal receiving apparatus of claim 1, wherein the determining unit is configured to determine that the program information is valid if the signature is identical to the confirmation signature, and determine that the program information is invalid if the signature is not identical to the confirmation signature.

3. The broadcasting signal receiving apparatus of claim 1, further comprising:
a play unit configured to play the broadcasting program if the determining unit determines that the program information is valid.

4. The broadcasting signal receiving apparatus of claim 1, wherein at least one of the public key parameters does not change irrespective of whether the broadcasting program is illegally duplicated or not.

5. The broadcasting signal receiving apparatus of claim 1, wherein the hash value is generated based on a program signal and the program identifier except the signature, is changed according to whether the broadcasting program is illegally duplicated or not.

6. The broadcasting signal receiving apparatus of claim 1, wherein, when the broadcasting program is illegally duplicated, one or more among the authentication information, distribution information, the copyright information, and the program identifier of the program information is modified, and the signature sustains as an initial value.

7. A method for controlling use of a broadcasting program using a signature included in program information in a system for controlling use of a broadcasting program comprising:
receiving a broadcasting signal;
extracting a broadcasting program and program information from the received broadcasting signal;
generating a confirmation signature to determine whether the program information is changed or not from the original program information; and
determining validity of the program information by comparing a signature included in the program information with the confirmation signature;

wherein the program information includes program protection information and a program identifier;

wherein the program protection information includes permission information for duplication and distribution of a corresponding broadcasting, copyright information, and authentication information;

wherein the signature included in the program protection information of the program information is generated by reflecting the program information when the broadcasting signal is initially generated, said signature is used to determine whether each field value includes error or not in the program information;

wherein the generating the confirmation signature includes:
generating an input stream using the program information except the signature;
calculating a hash value of the input stream; and
generating the confirmation signature from the hash value, public key parameters, and the signature.

8. The method of claim 7, wherein the program information is determined as valid if the signature is identical to the confirmation signature, and the program information is determined as invalid if the signature is not identical to the confirmation signature.

9. The method of claim 7, further comprising: playing the broadcasting program if the program information is determined as valid.

10. The method of claim 7, wherein the public key parameters have an identical value irrespective of whether the broadcasting program is illegally duplicated or not.

11. The method of claim 7, wherein the confirmation signature is different than the signature included in the program information if the broadcasting program was illegally duplicated.

12. The method of claim 7, wherein, when the broadcasting program is illegally duplicated, one or more among the authentication information, distribution information, the copyright information, and the program identifier of the program information is modified, and the signature sustains as an initial value.

* * * * *